United States Patent [19]
Ernst et al.

[11] Patent Number: 5,480,197
[45] Date of Patent: Jan. 2, 1996

[54] TOGGLE CATCH FOR INTAKE AIR FILTERS OF INTERNAL-COMBUSTION ENGINES, COMPRESSORS AND OTHER MACHINES WHICH TAKE IN AIR

[75] Inventors: Volker Ernst, Sachsenheim; Rudi Hainle; Volker Lehmann, both of Ludwigsburg, all of Germany

[73] Assignee: Filterwerk Mann & Hummel GmbH, Ludwigsburg, Germany

[21] Appl. No.: 145,166

[22] Filed: Nov. 3, 1993

[30] Foreign Application Priority Data

Nov. 3, 1992 [DE] Germany .............................. 9214938 U

[51] Int. Cl.⁶ .................................................. E05C 19/14
[52] U.S. Cl. ................ 292/113; 292/256.5; 292/DIG. 49
[58] Field of Search ..................................... 292/247, 262, 292/DIG. 49, 113, 256.5, 200

[56] References Cited

U.S. PATENT DOCUMENTS

| | | | |
|---|---|---|---|
| 247,547 | 9/1881 | Eiseman | 292/113 X |
| 679,539 | 7/1901 | Nosal | 292/113 X |
| 1,350,713 | 8/1920 | Ferdon | 292/247 |
| 1,469,196 | 9/1923 | Strange | 292/247 |
| 1,773,693 | 8/1930 | Stirrup | 292/113 |
| 2,548,367 | 4/1951 | Harris | 292/113 |
| 2,867,863 | 1/1959 | Webb et al. | 292/DIG. 49 X |
| 3,127,205 | 3/1964 | Griffiths et al. | 292/113 |
| 3,490,805 | 1/1970 | Di Pierro et al. | 292/DIG. 49 X |
| 4,213,643 | 7/1980 | Blind et al. | |
| 4,655,491 | 4/1987 | Murray | 292/DIG. 49 X |

FOREIGN PATENT DOCUMENTS

| | | | |
|---|---|---|---|
| 575086 | 4/1924 | France | 292/113 |
| 2802006 | 7/1979 | Germany . | |
| 553148 | 5/1943 | United Kingdom | 292/247 |
| 1029727 | 5/1966 | United Kingdom . | |

*Primary Examiner*—Rodney M. Lindsey
*Attorney, Agent, or Firm*—Evenson, McKeown, Edwards & Lenahan

[57] ABSTRACT

A toggle catch for the closing of first and second housing parts of intake air filters for machines which take in air has a toggle lever which pivotally engages in a bearing opening of an abutment, and a hook part. This hook part is pivotally fixed on the toggle lever. The hook part reaches over a projection of the first housing part. A spring band element is provided that has an end-face ear forming the abutment. The spring band element has a hook-shaped end that is engageable in a form-locking manner in a recess of the second housing part.

6 Claims, 1 Drawing Sheet

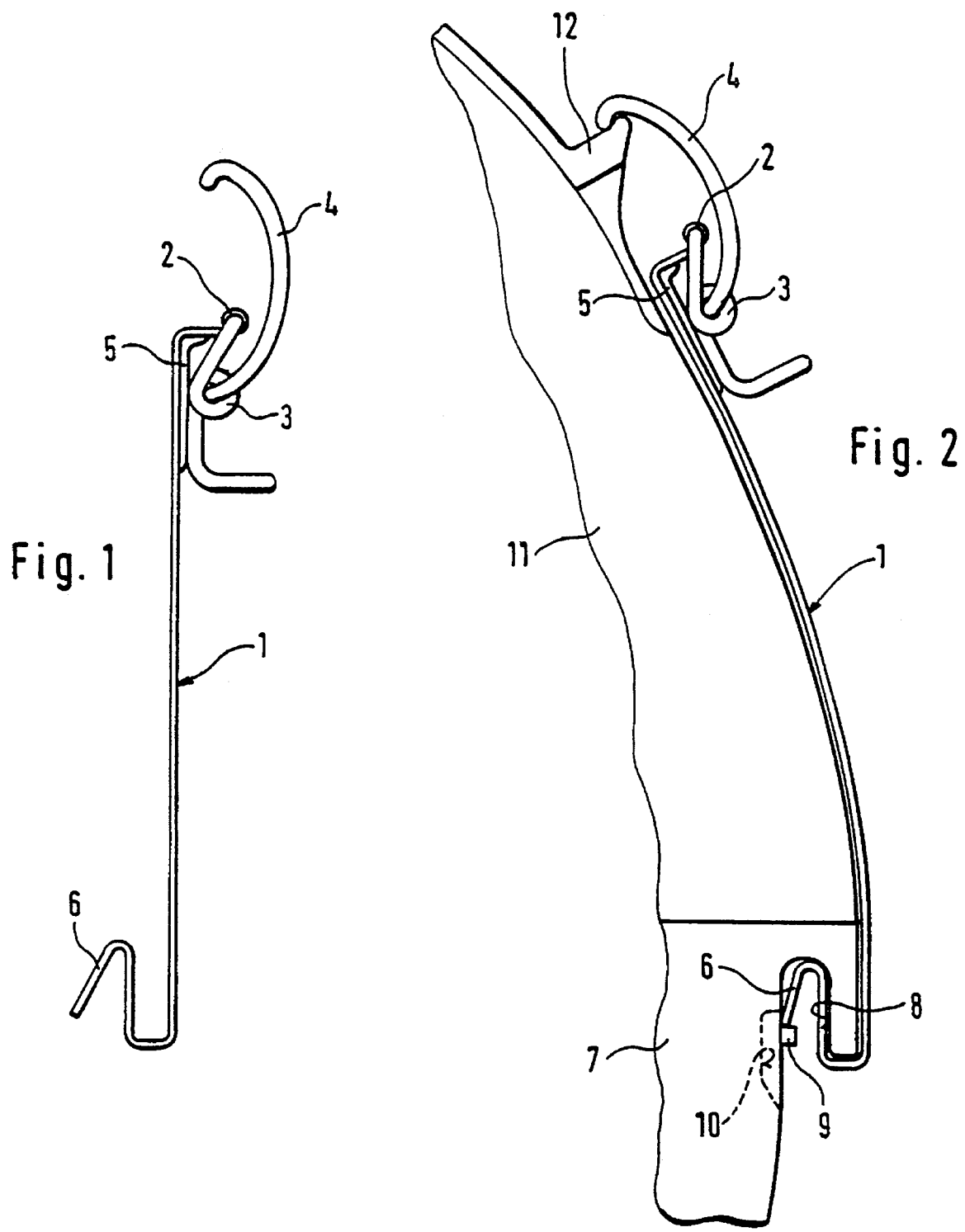

TOGGLE CATCH FOR INTAKE AIR FILTERS OF INTERNAL-COMBUSTION ENGINES, COMPRESSORS AND OTHER MACHINES WHICH TAKE IN AIR

BACKGROUND OF THE INVENTION

This invention relates to a toggle catch for intake air filters of internal-combustion engines, compressors and other machines which take in air, for the closing of two housing parts comprising a toggle lever which pivotally engages in a bearing opening of an abutment, and a hook part which is pivotally fixed on the toggle lever and reaches over a projection on the housing top part.

Toggle catches of this type are required in large quantities for the fastening of housing covers on the free edge of cup-shaped filter housings or for similar uses. They may be used to apply a relatively high tension force which can be raised almost arbitrarily by increasing the number of toggle catches used in the case of such a tension connection.

A toggle catch known from German Patent Document DE-PS 28 02 006 comprises a toggle lever, a hook part and an abutment. All three parts are made of wire. Normally, the toggle catch is arranged in the junction plane between the filter housing and the housing cover. A disadvantage of this arrangement is the fact that its handling is difficult, particularly in a narrow engine compartment. Attempts have therefore been made to lengthen the toggle catch in a suitable manner so that it cannot be operated on the junction plane between the housing parts but above the junction plane at an easily accessible point. For this purpose, for example, the wire-shaped abutment was lengthened and fastened to the filter housing in a suitable manner.

However, it is a disadvantage of this toggle catch that the catch is not secured with respect to being lost which results in the risk that, when the filter insert is exchanged, this catch may be lost as a result of carelessness.

SUMMARY OF THE INVENTION

An object of the present invention is to provide a toggle catch which is easy to manufacture and has a reliable method of operation.

This and other objects are achieved by the present invention which provides a toggle catch for the closing of first and second housing parts of intake air filters for machines which take in air, the toggle catch having a toggle lever which pivotally engages in a bearing opening of an abutment, and a hook part. This hook part is pivotally fixed on the toggle lever. The hook part reaches over a projection of the first housing part. A spring band element is provided that has an end-face ear forming the abutment. The spring band element has a hook-shaped end that is engageable in a form-locking manner in a recess of the second housing part.

It is an advantage of the present invention that the toggle catch can be mounted very easily and rapidly and locks in during the mounting in such a manner that it cannot be lost. In addition, the spring band element has the characteristic of swinging into its inoperative position in the opened condition of the toggle catch. By a suitable shaping of the spring band element, this inoperative position may be selected such that the catch does not interfere with the mounting and demounting of the filter insert.

According to certain embodiments of the present invention, the form-locking connection between the hook-shaped end of the spring band element and the housing may be achieved by an undercut of the housing part. This undercut may be interrupted at a suitable point in such a manner that the lug can be lifted off the undercut, for example, by means of a screwdriver or other tool, and a demounting is possible.

Particularly in the case of plastic parts on vehicles, recyclability is very important. In this context, it is significant that the metal parts, thus in this case the toggle catch with the spring element, can be removed from the housing in a simple manner. This can be achieved by the corresponding shaping of the housing part.

Another embodiment of the present invention provides a reinforcing bead on the spring band element in the area of the toggle catch. By means of this reinforcing bead, the springy area of the spring band element can be defined very precisely.

Certain embodiments of the invention provide that the fastening force for the spring band element is selected such that it can be applied manually and has to take place in a direction in which the force for the closing of the toggle catch must also be applied. This has the advantage that the spring band element will lock into the fastening area of the housing part merely by the closing of the toggle catch.

For preventing vibrations of the spring band element or of the toggle catch during the operation of the internal-combustion engine, a contact area may expediently be provided on the housing part on which the spring band element is supported.

Other objects, advantages and novel features of the present invention will become apparent from the following detailed description of the invention when considered in connection with the accompanying drawings.

BRIEF DESCRIPTION OF THE DRAWINGS

FIG. 1 is a view of a spring band element with a toggle catch constructed in accordance with an embodiment of the present invention;

FIG. 2 is a view of the element illustrated in FIG. 1 on a housing of an intake air filter.

DETAILED DESCRIPTION OF THE DRAWINGS

On its upper end, the spring band element 1 according to FIG. 1 has an ear 2. This ear 2 is constructed as an abutment for the toggle lever 3 of the toggle catch, the toggle lever 3 pivotally engaging in a bearing opening of the ear 2. A hook part 4 is arranged on the toggle lever 3. The toggle lever 3 and the hook part 4 consist of a correspondingly shaped steel wire in certain exemplary embodiments of the invention.

The spring band element 1 is designed in the shape of a strip. This strip has a width of approximately 10 mm. In the area of the ear 2 of the spring band element 1, the element 1 has a reinforcing bead 5. The springy area of the spring band element 1 starts below the reinforcing bead 5. The lower end of the spring band element 1 has a hook-shaped design, the lower end terminating in a springy lug 6.

FIG. 2 shows the toggle catch with the spring band element 1 in the installed condition. On a housing bottom part 7 consisting of a thermoplastic material, for example, a receiving opening 8 for the hook-shaped end of the spring band element 1 is situated. This receiving opening 8 is provided with an undercut above a detent nose 9. During installation, the spring band element 1 is pulled upwards and the lug 6 engages above the nose 9. An indentation 10 is provided directly adjacent to the nose 9. This indentation is still situated in the area of the spring band element 1 so that by means of a tool, such as a screwdriver, which reaches into the indentation, the lug 6 can be lifted off the nose 9 and a demounting of the toggle catch becomes possible.

The housing top part 11 of an intake air filter is also made of a thermoplastic material in certain embodiments and has a fastening projection 12. The hook part 4 is applied to this fastening projection 12 and thus causes a bracing or a fastening of the housing top part 11 on the housing bottom part 7. When the toggle catch is opened up, the spring band element 1 will spring into the stretched-out position as indicated in FIG. 1. The housing top part can therefore be removed without any problems, and the filter element which is situated in the housing and is not shown here can be exchanged.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A toggle catch for the closing of first and second housing parts of intake air filters for machines which take in air, comprising:

a toggle lever which pivotally engages in a bearing opening of an abutment;

a hook part that is pivotally fixed on the toggle lever, said hook part reaching over a projection of the first housing part; and a spring band element, wherein the abutment is an end-face ear of the spring band element, the spring band element also having a hook-shaped end having a lug that is engageable in a form-locking manner in an undercut fastening area of the second housing part.

2. A toggle catch according to claim 1, wherein the second housing part further comprises an indentation adjacent the undercut providing an access area for a tool to disengage the lug from the undercut.

3. A toggle catch according to claim 1 further comprising a reinforcing bead impressed on an end of the spring band element that faces the toggle lever.

4. A toggle catch according to claim 1 wherein a hook-shaped fastening of the spring band element takes place by a directed tensile force, the directed tensile force approximately coinciding with a tensile force direction for the toggle catch.

5. A toggle catch according to claim 1, wherein the spring band element is supportable on a surface of one of the housing parts.

6. A toggle catch according to claim 1, wherein the first housing part is a top housing part and the second housing part is a bottom housing part.

* * * * *